United States Patent [19]

Zado

[11] 4,194,931

[45] Mar. 25, 1980

[54] SOLDERING FLUX

[75] Inventor: Frank M. Zado, Lawrence Township, Mercer County, N.J.

[73] Assignee: Western Electric Co., New York, N.Y.

[21] Appl. No.: 956,945

[22] Filed: Nov. 2, 1978

Related U.S. Application Data

[60] Division of Ser. No. 846,464, Oct. 28, 1977, which is a continuation-in-part of Ser. No. 797,715, May 16, 1977, abandoned.

[51] Int. Cl.² .............................................. B23K 35/34
[52] U.S. Cl. ........................................ 148/25; 228/223
[58] Field of Search ........................... 148/24, 25, 23; 219/129; 228/214, 223

[56] References Cited

U.S. PATENT DOCUMENTS

| | | | |
|---|---|---|---|
| 319,128 | 6/1885 | Rosenberg | 148/25 |
| 1,859,651 | 5/1932 | Bowers | 148/25 |
| 1,927,355 | 9/1933 | Aston | 148/25 |
| 2,092,191 | 9/1937 | Thomas | 148/25 |
| 2,260,986 | 10/1941 | Coleman | 148/25 |
| 2,313,736 | 3/1943 | Dashner | 148/25 |
| 2,361,867 | 10/1944 | Pessel | 148/25 |
| 2,429,033 | 10/1947 | Silman | 148/25 |
| 2,445,431 | 7/1948 | Hill | 148/25 |
| 2,461,154 | 2/1949 | Hale | 148/25 |
| 2,461,155 | 2/1949 | Hale | 148/25 |
| 2,471,451 | 5/1949 | Rinkenbach | 148/25 |
| 2,474,863 | 7/1949 | Rinkenbach | 148/25 |
| 2,553,226 | 5/1951 | Williams | 148/25 |
| 2,575,413 | 11/1951 | Franklin | 148/25 |
| 2,674,554 | 4/1954 | Snell | 148/25 |
| 2,690,408 | 9/1954 | Pessel | 148/25 |
| 2,700,628 | 1/1955 | De Rosa | 148/23 |
| 2,715,084 | 8/1955 | König | 148/23 |
| 2,898,255 | 8/1959 | Thompson | 148/23 |
| 3,003,901 | 10/1961 | Marcell | 148/23 |
| 3,205,052 | 9/1965 | Downing | 148/25 |
| 3,575,738 | 4/1971 | Becker | 148/25 |
| 3,577,284 | 5/1971 | Schneider | 148/23 |
| 3,684,533 | 8/1972 | Conwicke | 106/1 |
| 3,730,782 | 5/1973 | Poliak | 148/25 |
| 3,734,791 | 5/1973 | Poliak | 148/23 |
| 3,837,932 | 9/1974 | Aronberg | 148/23 |
| 3,895,973 | 7/1975 | Stayner | 148/25 |
| 3,915,729 | 10/1975 | Eustice | 106/268 |
| 3,963,529 | 6/1976 | Tsunoshima | 148/25 |

OTHER PUBLICATIONS

Nittel et al., Schweisstechnik (Berlin), vol. 23(4), pp. 153-155.
Chemical Abstracts, vol. 82 (1975), p. 521, Abstract No. 50679s.
Chemical Abstracts, vol. 82 (1975), p. 521, Abstract No. 50682n.
Chemical Abstracts, vol. 82 (1975), p. 522, Abstract No. 50685n.
Chemical Abstracts, vol. 82 (1975), p. 522, Abstract No. 50691q.

*Primary Examiner*—P. D. Rosenberg
*Attorney, Agent, or Firm*—Joel F. Spivak

[57] ABSTRACT

A soldering flux is disclosed. The soldering flux comprises a mixture comprising rosin, an activator having at least one halogen atom and at least one destabilizing substituent and an acid solder surfactant selected from the polybasic carboxylic acid, a hydroxyl substituent thereof, a keto acid and a mixture of any of the foregoing surfactants.

16 Claims, 1 Drawing Figure

EFFECT OF FLUX ADDITIVES ON SOLDERABILITY
  
A　　　　A+S　　　　S

SOLDERING FLUX

CROSS REFERENCE TO RELATED APPLICATION

This is a division, of application Ser. No. 846,464, filed on Oct. 28, 1977, which is a continuation-in-part of application Ser. No. 797,715, filed May 16, 1977, now abandoned. Said copending application is assigned to the same assignee of the instant application.

BACKGROUND OF THE INVENTION

1. Field of the Invention

This invention relates to a soldering flux and more particularly, a non-corrosive soldering flux.

2. Description of the Prior Art

In soldering electronic components, circuits, equipment, etc., various kinds of fluxes are used together with soldering material so as to improve the efficiency of the soldering operation, to secure the soldered connections and to improve the long-term reliability of the connections. Conventionally, there are mainly used three kinds of flux: (1) water soluble flux which is made from inorganic acids, organic acids, amine hydrohalides, etc., (2) natural rosin and (3) activated rosin having a halogenated compound, e.g., an amine hydrohalide, incorporated with natural rosin.

Various additives have been added to rosin to form an activated rosin flux. Keto acids, for example, levulinic acid, have been combined with rosin (see U.S. Pat. No. 2,361,867). Adipic acid has also been combined with rosin in the formation of a flux core. Also, it has heretofore been known to combine adipic acid and levulinic acid with rosin to form a solder flux.

Water-soluble flux is very useful in removing oxides from the metal surface to be soldered. However, there are disadvantages in that the water-soluble flux is apt to destroy metallic material and to leave residues which corrode the soldered parts after soldering. The corrosion impairs the reliability of the soldered parts with respect to electrical and mechanical properties.

Natural rosin which is available under a name of WW rosin (water white rosin) presents no problems with respect to corrosiveness, but is inferior as a soldering adjuvant.

Activated rosin has a stability similar to natural rosin and causes little corrosion at room temperature. Also, fully activated or LRA fluxes have a strong fluxing action at a soldering temperature due to activators, such as an amine hydrochloride, which are typically present in high concentrations such as 1 to 10 weight percent of the resultant flux. However, the fully activated rosin or LRA flux has disadvantages in that a corrosive gas is produced at a soldering temperature and harms the surface of metal such as copper, brass, etc. Moreover, the residues of the activated rosin combine with moisture and produce an acid which causes corrosion similar to that produced by the water-soluble flux. Presently available fluxes containing organic hydrohalides, in the form of neutral salts, e.g., glutamic acid hydrochloride, either form corrosive metal halides at elevated temperature or the residues thereof combine with moisture at room temperature to form a corrosive acid and thus are used with possible deleterious effect for electrical soldering applications.

U.S. Pat. No. 2,898,255 reveals an activated rosin comprising a monocarboxylic acid, such as formic acid, combined with a dicarboxylic acid, such as glutaric acid. Such a flux, however, is too acidic and corrosive for practical use in electronics soldering operations. Such a flux is typical of an LRA flux which is corrosive, as evidenced by the standard copper mirror test outlined in the Electronics Industries Association Standard Number RS-402, for liquid rosin fluxes (approved Mar. 27, 1973).

A soldering flux which is superior in fluxing action and is free from corrosive action at room temperature as well as free from harmful residues is therefore desired.

SUMMARY OF THE INVENTION

The present invention is directed to a soldering flux and more particularly, to a non-corrosive soldering flux.

The soldering flux comprises a rosin mixture comprising (a) rosin, (b) an activator having at least one halogen atom and at least one destabilizing constituent and (c) an acid solder surfactant selected from (a') a polycarboxylic acid, (b') a hydroxyl substituent of (a'), (c') a keto acid and (d') a mixture of any of the foregoing surfactants.

BRIEF DESCRIPTION OF THE DRAWINGS

The present invention will be more readily understood by reference to the following drawing taken in conjunction with the detailed description, wherein the FIGURE is a photograph (2× magnification) of discrete portions of three printed wiring boards, the conductive pattern of each having been treated with various solder fluxes and then treated with solder.

DETAILED DESCRIPTION

The present invention is based upon the discovery of a unique non-corrosive solder flux. The term "corrosive" used herein in describing a solder flux means that the flux either (1) leaves an ionic residue on a surface being treated therewith, which ionic residue is present in an amount sufficient to corrode the surface upon the application of electricity thereto, or (2) is acidic enough to corrode the surface to which it is applied and which typically exhibits a pH of its aqueous solution of less then 3. The solder flux comprises a rosin mixture comprising rosin, an activator and a surfactant. The rosin mixture comprises about 50 to about 96 weight percent of rosin, about 0.3 to about 7 weight percent of the activator and a remainder of at least one weight percent of the surfactant, typically about 1 to about 49.7 weight percent of the surfactant. The terms "weight percent" and "percent by weight" as used herein mean weight of a component per total weight of a mixture or a solution expressed as a percentage.

The rosin mixture comprises a natural rosin such as water white rosin (WW rosin). Water white rosin is a well known material. Chemically, water white rosin is a mixture of several compounds. While the specific composition of the individual rosin utilized will vary depending upon the raw material source, water white rosin can generally be typified as a mixture of isomeric diterpene acids. The three major components are abietic type acids, D-pimaric acid and L-pimaric acid. An "average" rosin will comprise up to 80–90 weight percent abietic type acids, with the pimaric acids comprising 10–15 weight percent. The designation "water white rosin" refers to a grade of rosin determined by a conventional colorimetric method.

In addition to water white rosins, other rosins, such as hydrogenated wood rosin, and disproportionated wood rosin, etc., well known in the art, can be employed.

Combined with the rosin in the mixture is a suitable activator. An activator is a compound which cleans and prepares the surface to be soldered as by removing undesirable deposits, such as oxides. A suitable activator is any organic compound which contains at least one halogen atom, e.g., Cl, Br, etc., and at least one destabilizing atomic group or atom which permits the compound to decompose at or slightly below the soldering temperature employed, typically about 185° C. to 277° C. Since the halogen atom is electron withdrawing, the destabilizing group or atom should also be electron withdrawing thereby creating an instability in the compound due to the competing, e.g., opposed, electron withdrawing properties of at least two atoms or groups. Some typical destabilizing groups include the carboxyl group, carbonyl group, e.g.,

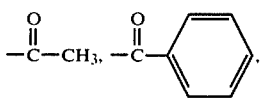

the aromatic hydrocarbon group or aryl group, e.g., phenyl, naphthyl, benzyl

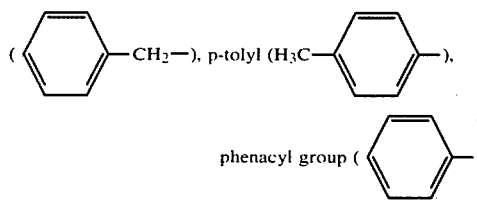

etc., and a second halogen atom, e.g., Cl, Br, etc.

The activator compound may comprise any organic compound having the following chemical structure

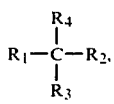

where $R_1$ is a halogen atom, $R_2$ is a destabilizing group selected from (1) the carboxyl group, (2) the aryl group, e.g., the phenyl, naphthyl, phenanthryl group, etc., the alkaryl group, the aralkyl group, the aryloxy group, (3) the carbonyl group,

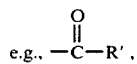

where R' is an alkyl radical, cycloalkyl radical, aryl radical, heterocyclic radical or the hydrogen atom, and (4) the halogen atom, $R_3$ and $R_4$ are the same as $R_1$ or $R_2$ or comprise an organic group or radical selected from alkyl, cycloalkyl, alkoxy and heterocyclic radicals or the hydrogen atom.

Preferred suitable activators include halogenated mono and dibasic (mono or dicarboxylic) organic acids. The acid activators have at least one halogen atom, e.g., Cl, Br, etc., preferably at the alpha position, i.e., at the carbon atom adjacent to the carboxyl group. Suitable halogenated monobasic (carboxylic) acids are those having at least 12 carbon atoms, e.g., 2-bromo-tetradecanoic acid, 2-bromo-octadecanoic acid, and typically comprise 12 to 18 carbon atoms. If the monobasic acid has less than 12 carbon atoms the resultant rosin flux may be too acidic and/or corrosive for electronics use and it may volatilize from the rosin flux and be lost prior to reaching the soldering temperature, e.g., typically 185° C.–260° C.

Suitable halogenated dicarboxylic (dibasic) organic acids are those having at least 4 carbon atoms, e.g., halogenated substituted succinic, adipic, pimellic acids, etc., e.g., 2,3-dibromosuccinic acid, 2-bromosuccinic acid, 2,2-dibromo-adipic acid, etc., and typically comprise 4 to 10 carbon atoms. If the dibasic acid has less than 4 carbon atoms, the resultant flux is too acidic and is corrosive.

The activator is present in the resultant rosin mixture in an amount sufficient to remove surface deposits such as oxides. The activator is present in an amount ranging from about 0.3 to about 7 weight percent of the resultant rosin mixture. If the activator is present in an amount less than about 0.3 weight percent, the activating effect thereof is insufficient. If the activator is present in an amount greater than about 7 weight percent, then residues of a rosin flux, employing the rosin mixture, e.g., a liquid rosin flux, occurring after soldering, may become corrosive.

Of course, mixtures of mono and dibasic acid activators may be employed for the solder flux.

Combined with the rosin and the activator in the rosin mixture is a solder surfactant. By "solder surfactant" is meant a compound which is principally added to the solder flux to aid in the spreading of the molten solder upon subsequent application thereof. The solder surfactant is a compound which improves the solder wetting rate of a surface, i.e., the surfactant enables better and more uniform spreading of molten solder across the surface to be soldered. Suitable surfactants include polybasic acids, e.g., polycarboxylic acids such as dicarboxylic and tricarboxylic acids. The dibasic acids typically have 4 to 10 carbon atoms. Suitable tricarboxylic acids typically comprise acids having 6 to 7 carbon atoms.

Other suitable surfactants include hydroxyl substituted polybasic acids, i.e., the hydroxyl substituents of the polybasic acids described above. Some typical hydroxyl substituted acids include tartaric acid and citric acid.

In addition, keto fatty acids or ketone acids, e.g., levulinic

are suitable surfactants. A particular effective solder flux is one comprising a surfactant mixture of a polybasic carboxylic acid, e.g., adipic acid, combined with a keto acid, e.g., levulinic acid.

The selected surfactant is present in the rosin mixture in an amount of at least one weight percent of the resultant rosin mixture. If the surfactant is present in an amount less than about one weight percent then there is no surfactant effect, other than the spreading caused by the flux itself on the surface to which it is applied. An improved, uniform spreading of molten solder across the surface to be soldered is thus not attained, that is, non-wetted areas (solder dewetted) are obtained.

It is to be noted and stressed hereat that the combining of the halogen substituted activator and the acid solder surfactant yields an unexpected and surprising synergism in any resultant flux which employs the rosin mixture, such flux being liquid, paste or solid. When combined, the resultant flux, employing the rosin mixture, and treatment therewith and with solder yields a solder deposit which is dull and/or satiny in appearance, which is advantageous in quality control inspection. Additionally, the combination leads to a soldered surface area which is uniform and complete, i.e., leads to a continuous deposit without voids or without solder dewetting, and without beading of the solder. Thus, for example, the combination reduces solder defects in wave soldering application, by a factor of about 5. The use of either the activator alone or the surfactant alone with rosin, in the form of a liquid, solid or paste flux, does not give either the dull surface appearance or the uniform and complete solder deposited area, or improve the efficiency of a soldering process, e.g., a wave soldering process.

The rosin mixture, in one embodiment, is typically contained in a suitable vehicle, e.g., a solvent carrier, in the form of a liquid to form a liquid solder flux. The resultant rosin mixture, e.g., comprising 50 to 96 weight percent rosin, 0.3 to 7 weight percent activator and a remainder of at least one percent surfactant, e.g., typically 1 to about 49.7 weight percent surfactant, is combined with a suitable solder vehicle, as by being dissolved in a suitable solvent, to form the liquid solder flux. A suitable solvent vehicle includes any solvent which is chemically inert with the rosin, the activator and the surfactant and in which the rosin mixture is soluble. Some suitable solvents include aliphatic alcohols, e.g., methanol, ethanol, isopropanol, 2-butoxyethanol, amyl alcohols, etc., alkanolamines, e.g., ethanolamine, diethanolamine, etc., chlorinated hydrocarbons, e.g., perchloroethylene, trichloroethylene, etc. Where a non-flammable liquid solder flux is required, the solvent employed is a non-flammable solvent such as a chlorinated hydrocarbon, e.g., perchloroethylene, trichloroethylene, etc.

The rosin mixture is combined with the solvent and mixed, using conventional techniques, to form a homogeneous solution. For ease in dissolution, the solvent is maintained at an elevated temperature, e.g., 110°-120° F. for ethanol, and upon complete dissolution is cooled to room temperature.

The rosin mixture is present in the resultant liquid rosin flux in an amount sufficient to yield the desired fluxing action, which in turn is dependent upon the metal members to be joined and the degree of solder to be applied and the manner of applying it. Typically, the rosin mixture is present in the liquid rosin flux in an amount ranging from about 9.7 to about 80 weight percent, e.g., 9.7 to 80 weight percent rosin mixture, remainder ethanol.

Additionally, the liquid rosin flux may contain a foaming expedient in the form of surface active foaming agent to improve the wetting of and to insure uniform flux deposition on hard to wet surfaces to be soldered. Suitable foaming agents include non-ionic surface agents. Among typical suitable foaming agents are those derived from fluorocarbons such as the "ZONYL" series manufactured by E. I. DuPont de Nemours; the "FLUORAD" series manufactured by Minnesota Mining and Manufacturing Company (3M Company), e.g., a perfluoropolyacrylate such as FC-430; polyethyleneoxy non-ionic ethers such as the "Triton" products manufactured by Rohm & Haas Company, e.g., "Triton X-100," "Triton X-165"; and non-ionic surface agents based on the reaction between nonylphenol and glycidol such as surfactants 6G and 10G manufactured by the Olin Company. The amount of surface active agent is not critical, the amount being sufficient to provide the degree of wetting and uniformity thereof desired. Typically, the surface active or foaming agent is present in an amount ranging from 0.001 to 0.01 weight percent of the resultant liquid flux.

Alternatively, instead of employing a foaming agent as a foaming expedient, as described above, a stabilizer solvent which stabilizes foaming may be combined with the suitable vehicle, e.g., ethanol, isopropanol, etc. Such suitable foaming expedients, that is suitable stabilizer solvents, include alkanolamines, e.g., ethanolamine, diethanolamine, triethanolamine, etc. Where the solvent vehicle does not already contain an alkanolamine, the alkanolamine is added thereto to function as the foaming expedient. Typically, the stabilizer solvent, e.g., ethanolamine, is present in an amount of about 32 to about 60 percent by weight of the total weight of the resultant flux.

In operation the metal surface of a first member and the metal surface of a second metal surface, to be soldered and joined together, are treated with the liquid solder flux using any conventional technique, e.g., dipping, spraying, brushing, rolling, foaming, wave fluxing, etc. The solvent of the flux is evaporated and at least one of the flux treated surfaces is then treated with molten solder, again using any conventional technique, e.g., wave soldering, to form a desired solder deposit. The second metal surface is contacted to the molten solder deposit to link the surfaces and the solder deposit is cooled below the liquidus temperature thereof to solder join the surfaces together.

In wave soldering, for example, the liquid solder flux is pumped continuously through a trough or other suitable vessel to form an exposed or standing wave of liquid flux or its foam. The metal surface of the first member and the second member is passed through or contacted with the standing wave of liquid flux or foam. Each member is then heated to remove the volatile constituents of the flux. A continuous stream of solder is then typically pumped up into a spout forming a head or wave of solder through which at least one of the members is passed to wet the metal surface thereof to be joined.

Where extremely difficult to solder surfaces are encountered, e.g., copper-tin-nickel alloy surfaces, metal surfaces having a heavy tarnish or metal oxide layer, etc., LRA solder fluxes, as classified in the Electronics Industries Association (EIA) Standard Number RS-402 (approved Mar. 27, 1973) [for liquid rosin fluxes], have heretofore been employed which contain large concentrations, e.g., 1 to 12 weight percent of the resultant flux of organohydrohalides, such as glutaric acid hydrochloride or amine hydrohalides, such as diethylamine hydrochloride and cetyl trimethylammonium bromide. However, such LRA fluxes are too corrosive and too acidic for most electronic applications. The above-described liquid flux of rosin mixture, solvent and optionally foaming expedient, e.g., agent, is successfully employed for such difficult to solder surfaces. Preferably, a secondary activator is added to the abovedescribed rosin flux mixture and optionally the foaming agent or stabilizer solvent, to form a mildly activated or LRMA liquid flux which achieves extremely successful soldering to such extremely difficult to solder surfaces without the accompanying defects of high acidity and corrosiveness. The secondary activator comprises any chemically compatible organohydrohalide which is capable of releasing a hydrogen halide or a halogen itself at the elevated temperatures employed, that is at the soldering temperatures, e.g., 185°–260° C. Suitable secondary activators include glutaric acid hydrochloride, amine hydrohalides, e.g., diethylamine hydrochloride, ethoxyamine hydrochloride and substituted ammonium halides such as cetyl trimethylammonium bromide. The maximum amount of the secondary activator combined with the rosin mixture and present in the resultant liquid flux is critical. The secondary activator, e.g., diethylamine hydrochloride, is combined with the rosin mixture in an amount ranging from about 0.17 to about 0.28 weight percent of the resultant combined components. If the amount of the secondary activator is greater than about 0.28 weight percent of the combined rosin mixture and secondary activator, then the resultant flux is too corrosive, leading to residues which corrode the soldered surfaces or parts after soldering and application of electrical power thereto, thereby impairing the reliability thereof with respect to electrical and mechanical properties. Of course, such a condition cannot be tolerated for electronic soldering applications. If the secondary activator is kept within the above critical concentration range, the resultant liquid flux is an LRMA or mildly activated flux as described in the aforementioned EIA Standard Number RS-402.

A particularly superior liquid flux is obtained when the activator comprises a dibromostyrene, e.g., 1,2-dibromo-1-phenylethane, and the secondary activator comprises diethylamine hydrochloride.

It is, of course, to be understood that the rosin mixture may be combined with any suitable vehicle known in the soldering art to form any conventional fluxing medium, e.g., solid, liquid, paste or paint, and the invention contained herein is not limited by the particular rosin mixture employed or the resultant flux medium itself, be it solid, liquid or paste.

In forming a solid or semisolid (paste) flux, the rosin mixture of rosin, activator and surfactant (optionally combined with the secondary activator) is combined with a conventional binder material vehicle, e.g., a grease binder, a wax binder, a glue binder, paraffin wax, etc., and additionally where a paste is desired, with a suitable solvent, e.g., a terpene, an alcohol, etc., which gives the proper consistency. Typically, the rosin mixture, comprising 0.3 to 7 weight percent activator, at least one weight percent surfactant, and typically 1 to about 49.7 weight percent surfactant, and a remainder of rosin, e.g., 50 to 96 weight percent rosin, is present in an amount of 80 to 95 weight percent in both the solid flux and the paste flux.

In another embodiment, the rosin mixture of rosin, activator and surfactant, optionally combined with the secondary activator, is directly combined with the particular solder alloy to be employed in a simultaneous flux and alloy application. In one such application, the rosin mixture is directly combined with the selected alloy in the form of a soldering paste. The solder alloy, which is in powder form, is intimately mixed or suspended in a medium comprising the rosin mixture (rosin, activator and surfactant), and a suitable paste carrier, such as for example paraffin wax, turpentine, polyethylene, glycol, etc. It is to be noted that any conventional paste carrier known in the art may be employed provided that it is chemically compatible with the rosin mixture and the solder alloy selected. Typically, the powdered solder alloy is present in the paste in an amount ranging from 70 to 90 weight percent whereas the rosin mixture, comprising 50 to 96 weight percent rosin, 0.3 to 7 weight percent activator and a remainder of at least one weight percent surfactant, e.g., typically 1 to about 49.7 weight percent surfactant, is present in an amount of 10 to 30 weight percent. The resultant solder-flux paste may be applied to a surface to be joined by brushing, rolling or screening.

In a second application for simultaneously applying flux and solder, the rosin flux mixture (rosin, activator and surfactant) and optionally the secondary activator is combined with a selected soft solder alloy, in the form of a solder core. The rosin mixture is contained as a solid, powder or even as a paste, within a wire of the solder alloy, functioning therein as the core. Usually, the solder alloy is simultaneously extruded with the flux mixture to form a solder core. Typically, the flux mixture, e.g., comprising 50 to 96 weight percent rosin, 0.3 to 7 weight percent activator and a remainder of at least one weight percent surfactant, e.g., 1 to about 49.7 weight percent surfactant, is present in the solder wire in an amount of about 0.5 to 5 weight percent of the total solder core wire.

It is to be pointed out and stressed hereat that the use of the rosin mixture comprising rosin, activator, surfactant and optionally the foaming expedient and/or optionally the secondary activator leads to a solder joint containing a minimum amount of solder as exhibited by forming a shallow solder joint meniscus.

EXAMPLE I

A. For comparison purposes, a printed wiring board comprising an epoxy substrate with a copper pattern thereon was employed. The copper pattern had a solder (60 weight percent Sn-40 weight percent Pb) coat thereon. A solder flux was prepared containing 37 weight percent water white rosin, 0.4 weight percent 2,3-dibromo-succinic acid activator, and 62.6 weight percent ethanol. The solder flux was applied, by brushing, to the solder coated copper pattern. The ethanol was allowed to evaporate at 25° C. and the flux-treated copper pattern was immersed in a molten solder bath (60 weight percent Sn, 40 weight percent Pb) for 5 seconds. A bright finish, non-uniform, discontinuous solder deposit, containing non-wetted areas or voids, was obtained, as illustrated in the FIGURE, wherein a portion of the flux- and solder-treated printed wiring board is shown and designated as "A."

B. The procedure of EXAMPLE I-A was repeated except that instead of the activator, a surfactant comprising 5 weight percent of adipic acid was employed. Essentially the same results were obtained as in Example I-A, as shown in the FIGURE, wherein a portion of the flux- and solder-treated printed wiring board is shown and designated as "S."

C. The procedure of EXAMPLE I-A was repeated except that the rosin flux contained 65 weight percent ethanol, 32.5 weight percent water white rosin, 2.1 percent adipic acid, 0.1 weight percent levulinic acid and 0.3 weight percent 2,3-dibromosuccinic acid. Surprisingly, a synergistic effect was obtained in that the resultant solder deposit was dull in finish and was uniform and complete in that no voids or solder beads were obtained. This is shown in the FIGURE, wherein a portion of the flux- and solder-treated printed wiring board is shown and designated as "A+S."

EXAMPLE II

The procedure of EXAMPLE I-C was repeated except that an epoxy board having an insulation resistance pattern was used and the soldered board was cooled to 77° F. and then washed with warm (110°–115° F.) isopropanol twice. The washed board was then exposed to a temperature of 90° F. and a relative humidity of 95%, in an environmental chamber, for 28 days. The insulation resistance was then measured as being greater than 100,000 megohms.

EXAMPLE III

A glass plate was vacuum coated with 0.12 mil (120μ inches) of copper metal. Two separate drops of the flux of EXAMPLE I-C were placed thereon and left for 24 hours at 25° C. and a relative humidity of 75%. There was no copper corrosion noted, thereby indicating the non-corrosive nature of the flux.

EXAMPLE IV

Silver chromate paper, commercially obtained, was wetted with the flux of EXAMPLE I-C. The paper did not change color, thereby indicating that the flux did not contain free halides and/or hydrohalides.

EXAMPLE V

Five milliliters of the flux of EXAMPLE I-C were added to 95 milliliters, of distilled water. The pH was then measured to be in excess of 3.5 which indicated that the flux was not acidic enough to cause corrosion.

EXAMPLE VI

The procedure of EXAMPLE I-C was repeated except that the rosin flux did not contain a keto acid but contained 63.6 weight percent ethanol, 34.2 weight percent of water white rosin, 2 weight percent of adipic acid (surfactant) and 0.2 weight percent 2,3-dibromosuccinic acid (activator). The synergistic effect obtained in EXAMPLE I-C was again observed. EXAMPLES II through V were then repeated with the flux of this example and essentially the same results as in those examples were obtained.

EXAMPLE VII

The procedure of EXAMPLE I-C was repeated except that the rosin flux contained 63.6 weight percent of ethanol, 34.2 weight percent of water white rosin, 2 weight percent of sebacic acid (surfactant) and 0.2 weight percent of 2,3-dibromosuccinic acid (activator). The synergistic effect obtained in EXAMPLE I-C was again observed. EXAMPLES II through V were then repeated with the flux of this example and essentially the same results as in those examples were obtained.

EXAMPLE VIII

The procedure of EXAMPLE I-C was repeated except that the rosin flux contained 63.6 weight percent of ethanol, 34.2 weight percent of water white rosin, 2 weight percent of azelaic acid (surfactant) and 0.2 weight percent of 2,3-dibromosuccinic acid (activator). The synergistic effect obtained in EXAMPLE I-C was again observed. EXAMPLES II through V were then repeated with the flux of this example and essentially the same results as in those examples were obtained.

EXAMPLE IX

The procedure of EXAMPLE I-C was repeated except that the rosin flux contained 63.6 weight percent of ethanol, 34.2 weight percent of water white rosin, 2 weight percent of sebacic acid (surfactant) and 0.2 weight percent of 2,4-dibromoacetophenone (activator). The synergistic effect obtained in EXAMPLE I-C was again observed. EXAMPLES II through V were then repeated with the flux of this example and essentially the same results as in those examples were obtained.

EXAMPLE X

The procedure of EXAMPLE I-C was repeated except that the rosin flux contained 63.6 weight percent ethanol, 34.2 weight percent of water white rosin, 2 weight percent of sebacic acid (surfactant) and 0.2 weight percent 1,1-dibromotetrachloroethane (activator). The synergistic effect obtained in EXAMPLE I-C was again observed. EXAMPLES II through V were then repeated with the flux of this example and essentially the same results as in those examples were obtained.

EXAMPLE XI

The procedure of EXAMPLE I-C was repeated except that the rosin flux contained 63.6 weight percent of ethanol, 34.2 weight percent of water white rosin, 2 weight percent of azelaic acid (surfactant) and 0.2 weight percent of 1,2-dibromo, 1-phenylethane (activator). The synergistic effect obtained in EXAMPLE I-C was again observed. EXAMPLES II through V were then repeated with the flux of this example and essentially the same results as in those examples were obtained.

EXAMPLE XII

The procedure of EXAMPLE I-C was repeated except that the rosin flux comprised 74.5 weight percent of ethanol, 12.5 weight percent of water while rosin, 12.5 weight percent of azelaic acid (surfactant) and 0.5 weight percent 1,2-dibromo-1-phenylethane (activator). The synergistic effect obtained in EXAMPLE I-C was obtained.

EXAMPLE XIII

The procedures of EXAMPLES II through V were repeated except with the flux of EXAMPLE XII. Essentially the same results as in those examples were obtained.

EXAMPLE XIII

A 50 mm long by 3.2 mm wide by 1.2 mm thick alloy strip comprising Cu, Ni and Sn was employed. A solder flux was prepared containing 20 grams of water white rosin, 7.6 grams of azelaic acid (surfactant), 0.6 grams of 1,2-dibromostyrene (activator), 0.08 grams of diethylamine hydrochloride (secondary activator), 0.002 grams of a commercially obtained surface active agent obtained from the 3M Company and designated as "FLUORAD 430" (foaming agent), and 71.718 grams of isopropanol. The solder flux was applied, by brushing, to the alloy strip. The isopropanol was allowed to evaporate at 25° C. and the flux treated strip was immersed in a molten solder bath (60 weight percent Sn, 40 weight percent Pb) for 5 seconds. The resultant solder deposit was dull in finish and was uniform and complete in that no voids or solder beads were obtained.

EXAMPLE XIV

A glass plate was vacuum coated with 0.12 mil (120μ inches) of copper metal to form a copper mirror. Two separate drops of the flux of EXAMPLE XII were placed on the plate and left for 24 hours at 25° C. and a relative humidity of 75%. There was no copper corrosion noted, thereby indicating the non-corrosive nature of the flux.

EXAMPLE XV

A piece of silver chromate paper, commercially obtained, was wetted with the flux of EXAMPLE XII. The paper did not change color, thereby indicating that the flux did not contain free halides and/or hydrohalides at concentrations sufficient to produce a visible reaction.

EXAMPLE XVI

Five milliliters of the flux of EXAMPLE XII were added to 95 milliliters of distilled water. The pH was then measured to be in excess of 3.5 which indicated that the flux was not acidic enough to cause corrosion.

It is to be understood that the abovedescribed embodiments are simply illustrative of the principles of the invention. Various other modifications and changes may be made by those skilled in the art which will embody the principles of the invention and fall within the spirit and scope thereof.

What is claimed is:

1. A method of soldering a metal which comprises:
applying to a surface a soldering flux comprising a rosin mixture of (a) rosin; (b) an activator having at least one halogen atom and at least one destabilizing substituent; and (c) a surfactant selected from the group consisting of (a'') a polycarboxylic acid, (b'') a hydroxyl substituent of (a''), (c'') a keto acid and (d'') a mixture of any of the foregoing surfactants, to form a flux treated surface.

2. The method as defined in claim 1 wherein:
said activator comprises a halogen substituted carboxylic acid selected from the group consisting of a monobasic acid having 12 to 18 carbon atoms, a dibasic acid having 4 to 10 carbon atoms and a mixture thereof; and
said polycarboxylic acid surfactant and said hydroxyl substituent thereof each comprise 4 to 10 carbon atoms.

3. The method as defined in claim 1 wherein said surfactant comprises a polybasic acid selected from the group consisting of a dicarboxylic acid having at least 4 carbon atoms, a tricarboxylic acid having 6 to 7 carbon atoms and a mixture thereof.

4. The method as defined in claim 1 wherein said rosin mixture comprises rosin, a dibromosuccinic acid and adipic acid.

5. The method as defined in claim 4 wherein said rosin mixture further comprises levulinic acid.

6. The method as defined in claim 1 wherein said rosin mixture comprises said activator in an amount ranging from about 0.3 to about 7 weight percent, said surfactant in an amount ranging from about 1 to about 49.7 weight percent and a remainder of said rosin.

7. The method as defined in claim 1 wherein said rosin mixture is combined with a secondary activator comprising an organohydrohalide.

8. The method as defined in claim 7 wherein said solder flux comprises a liquid carrier and a foaming expedient.

9. The method as defined in claim 1 which further comprises applying a solder alloy to said flux treated surface.

10. An additive for a rosin flux which comprises:
an activator having at least one halogen atom and at least one destabilizing substituent selected from the group consisting of (a') the carboxyl group, (b') the aryl group, (c') the carbonyl group and (d') the halogen atom; and a surfactant selected from the group consisting of (a'') a polycarboxylic acid, (b'') a hydroxyl substituent of (a''), (c'') a keto acid and (d'') a mixture of any of the foregoing surfactants.

11. The additive as defined in claim 10 which further comprises a secondary activator comprising an organohalohydride.

12. The additive as defined in claim 10 wherein said activator comprises a halogen substituted carboxylic acid.

13. The additive as defined in claim 10 wherein said surfactant comprises a polycarboxylic acid selected from the group consisting of dicarboxylic acid having at least 4 carbon atoms, a tricarboxylic acid having 6 to 7 carbon atoms and a mixture thereof.

14. The additive as defined in claim 10 which comprises a dibromosuccinic acid and adipic acid.

15. The additive as defined in claim 14 which further comprises levulinic acid.

16. The additive as defined in claim 11 which comprises azelaic acid, a dibromostyrene activator and a secondary activator comprising diethylamine hydrochloride.

* * * * *